United States Patent Office 3,322,485
Patented May 30, 1967

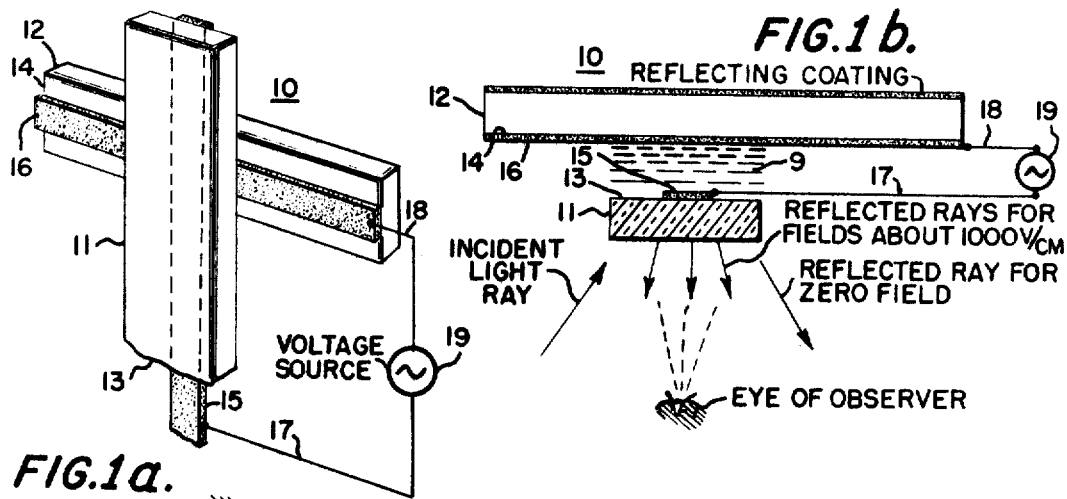
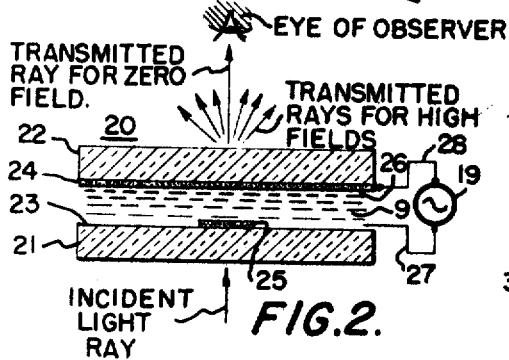
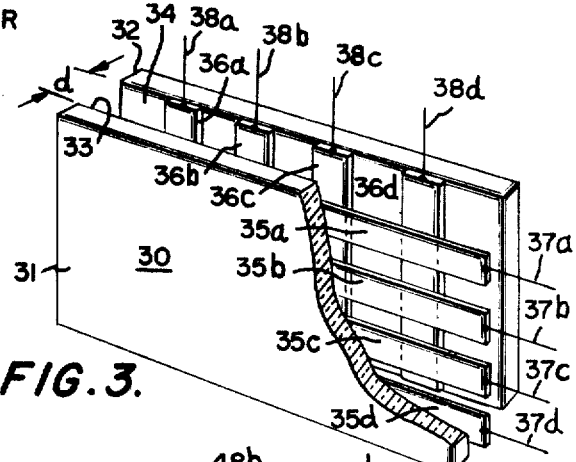
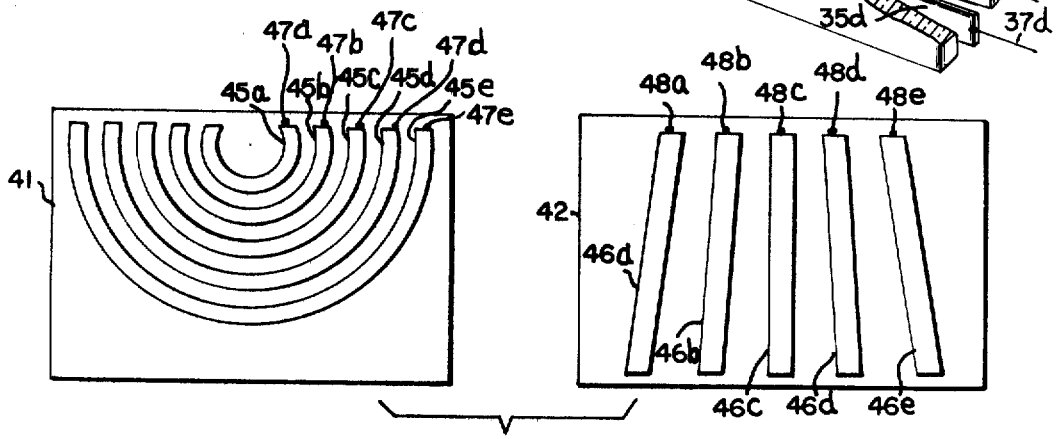
INVENTOR.
RICHARD WILLIAMS

3,322,485
ELECTRO-OPTICAL ELEMENTS UTILIZING AN ORGANIC NEMATIC COMPOUND
Richard Williams, Princeton Junction, N.J., assignor to Radio Corporation of America, a corporation of Delaware
Filed Nov. 9, 1962, Ser. No. 236,546
9 Claims. (Cl. 350—160)

This invention relates to improved electro-optical elements useful for making light valves, optical display devices, and for similar applications which involve the modulation of light.

A variety of devices are known which can modulate light. Some of these prior art devices require that the light first be polarized. Others require elaborate structures, which are inherently expensive and difficult to fabricate. Still other prior art devices have the drawback that their speed of response is low. Improvement is desirable in all these respects.

It is therefore an object of this invention to provide an improved electro-optical element.

Another object of this invention is to provide a simple and inexpensive electro-optical element for the modulation of light.

Still another object is to provide an electro-optical element having improved speed of response.

Another object is to provide an electro-optical element which can modulate ordinary unpolarized light.

These and other objects of the invention are accomplished by providing an electro-optical element comprising two substrates having adjacent parallel surfaces less than ½-millimeter apart, such as planar plates positioned so that their adjacent opposing faces are substantially parallel. The space between the adjacent faces of the two substrates is filled with an organic nematic mesomorphic compound. Means such as conductive coatings on each of the adjacent faces are provided for applying an electric field between said faces and through the compound. A device may be constructed in which the field is applied selectively to change the light reflective or light transmissive properties of the element.

The invention will be described in greater detail in connection with the accompanying drawing, in which FIGURES 1a–1b are a schematic perspective view and a sectional view of an electro-optical element embodying the invention;

FIGURE 2 is a sectional view of another electro-optical device embodying the invention;

FIGURE 3 is a schematic perspective view of another optical display device embodying the invention; and FIGURE 4 is a plan view of the two substrates in another optical display device embodying the invention; therefor

MESOMORPHIC MATERIALS

The three common states of matter or states of aggregation are the solid, liquid, and the gas, in which the randomness of geometrical arrangement of the molecule increases from from the solid to the liquid to the gas. The gas and the ordinary liquid are both isotropic, having the same physical properties in all directions. The solid may be amorphous, in which case the geometrical arrangement of the molecules is random, but the molecules are sufficiently bound so they are unable to move with respect to each other. Most inorganic and organic solids are found to be crystalline, that is, their molecular units are arranged in a regular repeating geometric pattern known as a lattice unit. Many crystalline solids are anisotropic, since their physical properties vary depending on the direction of measurement with respect to the different crystal axes. For most pure substances, the transition temperature between the solid state and the liquid sate is quite sharp, so that it has become customary to regard the sharpness of the melting point of a solid material as an indication of the purity of the material.

Certain organic solid compounds such as esters of cholesterols exhibit a peculiar behavior when heated. These substances melt sharply at one temperature, but produce a turbid melt. On further heating to a higher temperature, the turbid melt abruptly changes to a clear isotropic liquid. In the temperature range between the solid and the isotropic liquid, these materials are anisotropic with respect to light when viewed between crossed polaroids. The characteristics of these materials are thus partly those of the crystalline solid, since they are anisotropic, and partly those of the isotropic liquid, since they exhibit liquid flow. The materials are therefore often called "liquid crystals," or, more accurately, "crystalline liquids." At present, it is customary to regard these materials as forming a fourth state of matter known as the mesomorphic state or mesophase, since it is a state or phase intermediate between that of the anisotropic crystal and that of the isotropic liquid.

There are several mesomorphic states or forms, such as the semectic mesophase and the cholesterolic mesophase. One of these is the nematic mesophase. The term "nematic" means "thread-like," since materials in this state frequently assume a characteristic thread-like texture when a thin section of the material is viewed between crossed polaroids. When a nematogenic crystalline solid is heated in a capillary tube, the crystals collapse sharply at the melting point, but in this case form a flowing turbid liquid which uniformly fills the capillary to a particular height, and exhibits a definite meniscus. At a higher temperature, the turbidity of this nematic mesophase suddenly disappears, and the liquid becomes an ordinary isotropic liquid. An example of a compound which exhibits a nematic mesophase is 4'-methoxybiphenyl-4 carboxylic acid. Some organic compounds, for example, 5 chloro-6-n-heptyloxy-2 naphthoic acid, may exist in either the anisotropic crystalline solid phase, or the anisotropic smectic (a different) mesophase, or the anisotropic nematic mesophase, or the isotropic ordinary liquid phase, depending on the temperature. It is believed that in the nematic mesophase the molecules of the melt are ordered so that the molecules are parallel, but the ends of the molecules are not in any definite or regular arrangement.

Mesomorphic states are generally thermotropic, that is, they are exhibited only within a certain temperature range above the melting point of the solid, and hence are restricted to melts. It has been found that when certain solid compounds are dissolved in a suitable solvent, the resulting solution is not a true solution, since it is not isotropic with respect to the transmission of light. The alkali metal salts of long chain aliphatic acids tend to exhibit such behavior. When an excess of the solvent is added, these anisotropic solutions become true isotropic solutions. Certain inorganic materials such as vanadium pentoxide also exhibit this type of behavior when dissolved in a suitable solvent. These characteristics of inorganic materials are thought to be connected with the colloidal state. Since the anisotropy of these materials depends on their being suitably dissolved, and exists at temperatures below the melting point of the solid, this type of mesomorphism is known as lyotropic (as opposed to thermotropic) mesomorphism.

For a more complete discussion of the mesomorphic states or mesophases, see, for example, G. W. Gray, Molecular Structure and the Properties of Liquid Crystals, Academic Press, New York, 1962.

Mesomorphic materials suitable for the practice of this invention are organic thermotropic nematic compounds. Examples of such compounds are:

| Compound | Structural Formula |
|---|---|
| (1) Deca-2,4, dienoic acid | $CH_3(CH_2)_4CH=CH-CH=CH-COOH$ |
| (2) 4,4′ di-n-heptoxyazoxybenzene | $C_7H_{15}-O-\langle\text{ring}\rangle-N=N(\to O)-\langle\text{ring}\rangle-O-C_7H_{15}$ |
| (3) 4,4′ di-n-hexoxyazoxybenzene | $C_6H_{13}-O-\langle\text{ring}\rangle-N=N(\to O)-\langle\text{ring}\rangle-OC_6H_{13}$ |
| (4) 4,4′ di-n-pentoxyazoxybenzene | $C_5H_{11}-O-\langle\text{ring}\rangle-N=N(\to O)-\langle\text{ring}\rangle-OC_5H_{11}$ |
| (5) 4,4′ di-n-butoxyazoxybenzene | $C_4H_9-O-\langle\text{ring}\rangle-N=N(\to O)-\langle\text{ring}\rangle-OC_4H_9$ |
| (6) 4,4′-diethoxyazoxybenzene | $C_2H_5-O-\langle\text{ring}\rangle-N=N(\to O)-\langle\text{ring}\rangle-OC_2H_5$ |
| (7) Undeca-2,4-dienoic acid | $CH_3(CH_2)_5=CH-CH=CH-COOH$ |
| (8) Nona-2,4-dienoic acid | $CH_3(CH_2)_3CH=CH-CH=CH-COOH$ |
| (9) 4,4′-dimethoxystilbene | $CH_3O-\langle\text{ring}\rangle-CH=CH-\langle\text{ring}\rangle-OCH_3$ |
| (10) 2,5-di(p-ethoxybenzylidene)cyclopentanone | $C_2H_5O-\langle\text{ring}\rangle-CH=\langle\text{cyclopentanone}\rangle=CH-\langle\text{ring}\rangle-OC_2H_5$ |
| (11) 2,7-di-(benzylideneamino)fluorene | $\langle\text{ring}\rangle-CH=N-\langle\text{fluorene}\rangle-N=CH-\langle\text{ring}\rangle$ |
| (12) 2,p-methoxybenzylideneaminophenanthrene | $CH_3O-\langle\text{ring}\rangle-CH=N-\langle\text{phenanthrene}\rangle$ |
| (13) 4-methoxy-4″-nitro-p-terphenyl | $CH_3O-\langle\text{ring}\rangle-\langle\text{ring}\rangle-\langle\text{ring}\rangle-NO_2$ |
| (14) p-Azoxyanisole | $CH_3O-\langle\text{ring}\rangle-N=N(\to O)-\langle\text{ring}\rangle-OCH_3$ |
| (15) 4-p-methoxybenzylideneaminobiphenyl | $\langle\text{ring}\rangle-\langle\text{ring}\rangle-N=CH-\langle\text{ring}\rangle-OCH_3$ |
| (16) 4,4′-di-(benzylideneamino)biphenyl | $\langle\text{ring}\rangle-CH=N-\langle\text{ring}\rangle-\langle\text{ring}\rangle-N=CH-\langle\text{ring}\rangle$ |
| (17) p-n-Hexylbenzoic acid | $C_6H_{13}-\langle\text{ring}\rangle-COOH$ |
| (18) p-n-Propoxybenzoic acid | $C_3H_7O-\langle\text{ring}\rangle-COOH$ |
| (19) Trans-p-methoxycinnamic acid | $CH_3O-\langle\text{ring}\rangle-CH=CHCOOH$ |
| (20) 6-methoxy-2-naphthoic acid | $CH_3O-\langle\text{naphthalene}\rangle-COOH$ |

Example I

An electro-optical device according to one embodiment of the invention will now be described with reference to FIGURE 1a. The device 10 comprises two substrates 11 and 12, which are preferably plates each having plane opposed parallel faces. Substrates 11 and 12 are positioned opposite each other so that their adjacent faces 13 and 14 respectively are parallel. The distance between the inner faces 13 and 14 of the two substrates is critical, as will be explained below, and should be less than one-half millimeter. Preferably, the distance between faces 13 and 14 is about 5 to 300 microns. The substrates are prepared with at least one electrically conductive region or strip 15 on inner face 13 of plate 11, and at least one conductive region or strip 16 on the inner face 14 of plate 12. The two plates 11, 12 and their conductive regions are positioned so that the axis of the conductive path or paths on one plate are substantially transverse or perpendicular to the axis of the conductive paths on the other plate. An electrical lead wire 17 is connected to the conductive path 15 on wafer 11, and another electrical lead wire 18 is connected to the conductive path 16 on wafer 12, using known techniques. For example, the lead wires can be attached to the conductive strips by means of a droplet of silver paste. Lead wires 17 and 18 are connected to a voltage source 19.

At least one of the two substrates or plates 11 and 12 is transparent. Furthermore, the conductive region or paths on the transparent substrate is also transparent. In this example, only one of the two substrates is transparent. A variety of transparent solids may be utilized for the transparent substrate, including the various types of glass, fused quartz, transparent varieties of corundum, and transparent plastics or resins. In this example, substrate 11 is transparent, and consists of a glass microscope slide. The conductive portion 15 on the transparent substrate 11 is also transparent, as indicated above. This may conveniently be accomplished by depositing thin layers of indium oxide or tin oxide on the desired regions of inner face 13 on transparent plate 11. In this example, plate 12 is also a glass microscope slide, but is made reflecting by any convenient means, for example by depositing a metallic coating such as silver or aluminum on the outer face of plate 12. The conductive region 16 on face 14 of plate 12 need not be transparent, and may for example be a film of copper or gold.

The operation of the device of this example will be described with reference to FIGURE 1b. The transparent plate 11 and the reflecting plate 12 of this example are positioned about 10 microns apart by means of shims (not shown). Alternatively, the spacing may be maintained by means of clamps, or by a suitable frame-like holder. The space between the two plates is filled with an organic thermotropic nematic compound 9 such as p-azoxyanisole. The device 10 is maintained in the temperature range in which the compound exhibits the nematic mesophase, that is, in the temperature range above the melting point of the solid compound but below the temperature at which the molten compound becomes isotropic. It will be understood that in the remainder of this specification and in the appended claims, when reference is made to an organic nematic thermotropic compound, the compound is in that particular temperature range in which the nematic mesophase is exhibited.

The observer views the device through the transparent plate 11 and the transparent conductive region or electrode 15. A light source is positioned so that a collimated beam of light rays is incident on the transparent substrate 11. The angle between the incident light ray and the substrate 11 is less than 45°, and preferably less than 22°. When the electric field between the conductive strips or electrodes 15 and 16 is zero, most of the incident light is reflected by substrate 12 in a regular manner, so that the angle of incidence equals the angle of reflection. Under these circumstances, as shown in FIGURE 1b, very little light is reflected to the eye of the observer, whose line of sight is normal to the transparent plate 11 and transparent electrode 15 and the layer 9 of organic nematic thermotropic material. Accordingly, for zero applied field the observer sees the entire area of the transparent electrode over the organic nematic thermotropic compound as dark.

When a weak field is applied between electrodes 15 and 16 by the voltage source 19, no change is seen by the observer. If the strength of the applied field is slowly increased, there is no visible change in the light intensity of the device viewing area, that is, the area of the transparent substrate over the nematic compound, until a certain threshold value is reached. This threshold value for the applied field varies with the particular organic nematic thermotropic compound and the particular distance between the two electrodes, but for most organic nematic thermotropic compounds is of the order of magnitude of about 1,000 volts per centimeter. When the voltage applied between the two electrodes reaches this value, there is a sudden change in the optical properties of layer 9 for that portion only of the organic nematic thermotropic compound 9 which is between the two electrodes and subject to the field. As a result of this change, some of the incident light is scattered through the transparent electrode 15 and the transparent plate 11 in a direction normal to the plate 11, and hence this scattered light reaches the eye of the observer. Thus, the observer, who has hitherto seen the entire area of the nematic layer 9 as uniformly dark, suddenly sees a particular portion of this area become brighter than the remainder of the area. The particular area which becomes bright is that area only of the nematic layer 9 which is directly between the intersection of the transparent conductive strip 15 and the conductive strip 16.

Although various experimenters have applied electrical fields to various mesmorphic compounds, this light scattering effect has not hitherto been observed. One reason is that experimenters have been measuring other properties of these compounds. More important, most experimenters have used mesomorphic layers which were more than one-half millimeter thick, whereas, as indicated above, the effect is only observed when the mesomorphic layer is both nematic and thermotropic and is less than one-half millimeter in thickness. In fact, the effect is observed best only when the nematic thermotropic compound layer is less than 300 microns in thickness.

While the exact nature of this light scattering effect is not definitely ascertained, it is theorized that groups of the parallel-oriented molecules of the nematic compound exist and in each group all the molecules tend to move in the same direction at the same time. Such groups or swarms of molecules may be regarded as domains. These domains tend to change their direction when the electrical field across the material reaches a certain threshold value. This change in the direction of groups or swarms of the molecules, all the molecules within each individual group or domain being similarly oriented, is thought to result in the scattering of light by the domain walls.

In the embodiment just described, the effect is obtained by modulating light reflection, and the observer sees a predetermined area of the device become bright, while the remaining area remains dark. In the embodiment described in Example II, the effect is obtained by modulation of light transmission, and the observer sees a predetermined area of the device become dark, while the remaining area remains bright.

*Example II*

In the device 20 of this example, both substrates or plates 21 and 22 (FIGURE 2) are made of transparent materials. Fused quartz is one of the transparent materials suitable for this purpose. The quartz plates 21 and 22 are aligned so that their adjacent faces 23 and 24 respectively are parallel and spaced about 20 microns apart. The conductive region or electrode 25 on face 23 of plate 21 is transparent, as is the electrode 26 on face 24 of plate 22. The transparent electrodes 25 and 26 may, for example, consist of films of indium oxide or tin oxide, and are substantially perpendicular to each other in a manner similar to those of electrodes 15 and 16 in FIGURE 1a. An electrical lead wire 27 is attached to electrode 25 and another electrical lead wire 28 is attached to electrode 26. Lead wires 27 and 28 are connected to a voltage source 19. The space between the two substrates or plates 21 and 22 is filled with an organic nematic thermotropic compound, which in this example consists of anisaldazine.

The observer views the device in a direction normal to the two transparent electrodes 25 and 26. A light source is positioned to direct a collimated beam of light rays on the side of the device 20 opposite the observer so that the incident light rays pass through the device normal to the transparent plates 21 and 22 and the transparent electrodes 25 and 26 and the layer 9 of the organic nematic thermotropic compound. When the electric field between the two conductive paths or electrodes 25 and 26 is zero, the light rays transmitted through the device are in the same direction as the incident light rays. The observer therefore sees the region of the device which contains the organic nematic thermotropic compound layer 9 as uniformly bright.

When the electric field between the two conductive paths 25 and 26 is increased, no effect is observed until a certain threshold value is reached. As indicated above, this threshold value for the applied field is of the order of 1,000 volts per centimeter. When this threshold value for the applied field is reached, there is a sudden change in the optical properties of that portion only of layer 9 which is directly between the two electrodes 25 and 26. This change in optical properties is manifested as a scattering of the transmitted light in all directions. The observer, who has hitherto seen the entire area of the nematic layer 9 as uniformly bright, now suddenly sees a portion of this area become darker than the remaining area. The darker area is that area only which is in the intesection of the two conductive paths or electrodes 25 and 26.

In the devices of Example I and Example II, only one conductive path or electrode was shown. Devices may be constructed containing a plurality of conductive paths or electrodes on each substrate. One may thus fabricate an optical display device containing an x–y grid. Such a device may be used to display patterns or pictures, and is particularly suitable for the display of information in rectilinear coordinates. One such device will now be described.

*Example III*

An optical display device 30 embodying an x–y grid comprises two planar substrates 31 and 32 (FIGURE 3), which in this example consists of transparent plates of corundum ($Al_2O_3$ or transparent sapphire). The two plates 31 and 32 are parallel, and are separated by a distance d which is less than one-half millimeter, and preferably about 5 to 300 microns. In this example, the distance d is 40 microns. On the inner face 33 of plate 31 an array of transparent conductive strips are deposited, all running in one direction. In this example, only four such strips or electrodes (35a, 35b, 35c, 35d) are shown for greater clarity, but it will be understood that in practice, a much larger number of electrodes may be utilized. The strips 35a to 35d have parallel longitudinal axes. On the inner face 34 of plate 32, an array of transparent conductive electrodes are deposited, all running in the same direction substantially perpendicular to the direction of the conductive strips on plate 31. Again only four such strips or electrodes (36a, 36b, 36c, 36d) are shown for greater clarity. The strips 36a to 36d have parallel longitudinal axes normal to the axes of strips 35a to 35d. The space between plates 31 and 32 is filled with an organic nematic thermotropic compound, which in this example, consists of 4,4′-dimethoxystilbene.

The optical display device 30 of this embodiment is utilized in a manner similar to that shown in FIGURE 2, since both substrates and both sets of electrodes are transparent. A light source is positioned on one side of the device so that a collimated beam of light is directed through the device in a direction normal to the plates 31 and 32. The observer is on the opposite side of the device. For zero applied field, the observer sees the entire area of the nematic thermotropic compound as uniformly bright. Now when a voltage pulse is applied between one electrode strip of the group 35a, 35b, 35c, 35d and another electrode strip of the group 36a, 36b, 36c, 36d, then provided the voltage applied is equal to or greater than the critical field, the observer will see a portion of his field of view become darker than the remaining area of the nematic compound. The portion that becomes darker will be that portion corresponding to the intersection of the two electrodes which have been energized. For example, if the two electrode strips energized are 35a and 36d, the portion of the plate area which will suddenly darken is the area corresponding to the intersection of electrode strip 35a and electrode strip 36d.

By energizing more than one electrode strip from each set, a plurality of predetermined areas are thus darkened. Scanning techniques known to the optical display art may be utilized to sequentially and cyclically energize the conductive strips of one array, for example the vertical columns 36a to 36d, at a relatively rapid rate, while the conductive strips of the other array, which are the horizontal rows 35a to 35d in this example, are sequentially and cyclically energized at a relatively slower rate. Row selector circuits and column selector circuits for energizing selected rows and columns of an x–y grid are known to the mural television art, and need not be described in detail here. See, for example, U.S. 2,928,894, issued Mar. 15, 1960, to J. A. Rajchman, and assigned to the assignee of this application. In this manner various types of information may be optically displayed, for example, a pattern of an alpha-numerical character. Furthermore, by using a large number of narrow electrode strips on each substrate, for example, electrode strips that are on the order of one mil wide and spaced one mil apart, a photograph or picture can be displayed on a device of this type.

An important advantage of the optical display devices described in this example is that there is very little crosstalk or spurious display, since those portions of the organic nematic thermotropic compound which are not directly between the two energized electrodes do not receive the threshold field, and hence do not exhibit the optical effect of modulating either the transmission or the reflection of light.

Still another advantage of the optical display devices described in this example is that they do not require polarized light, and may be utilized with any wavelength for which the substrate and the organic nematic thermotropic compound is transparent.

Another important advantage of the optical display devices described in this example is that their relaxation time is sufficiently short so that different displays may be shown at as high a rate as 30 frames per second. Hence the devices are compatible with present television standards.

The display device of Example III is operated by the modulation of light transmission. In the optical display device of Example IV, operation is by the modulation of light reflection.

*Example IV*

Another optical display device embodying an x–y grid embodying the invention comprises two planar substrates such as plates 31 and 32 in FIGURE 3. In this embodiment, only one plate and its associated electrodes or conductive strips are transparent. The transparent substrate in this example is plate 31, and consists of a transparent plastic such as Plexiglas or the like. An array or grid of transparent conductive paths such as 35a, 35b, 35c, 35d are deposited on one major face of transparent plate 31, all of these paths running in the same direction. The other substrate or plate 32 in this example is preferably made of an opaque and reflecting material. In this example, plate 32 consists of aluminum. Strips of an insulating lacquer (not shown) are deposited on one face 34 of plate 32 so that all the strips are parallel and in one direction. A conductive metal such as silver or gold is then deposited, for example, by evaporation, on the insulating strip so as to form an array or grid of conductive paths 36a, 36b, 36c, 36d. The plates 31 and 32 are positioned opposite and parallel to each other, so that the array or grid of transparent conductive strips 35a, 35b, 35c, 35d is substantially perpendicular to the grid of conductive strips 36a, 36b, 36c, 36d. In this example, the distance between plates 31 and 32 is 60 microns. The space between plates 31 and 32 is filled with an organic nematic thermotropic compound, which, in this example, is dibenzalbenzidine. Electrical lead wires 38a, 38b, 38c, 38d are attached to conductive strips 36a, 36b, 36c, 36d, respectively. Similarly, lead wires 37a, 37b, 37c, 37d are attached to conductive strips 35a, 35b, 35c, 35d, respectively.

The optical display device of this example is utilized in a manner similar to that shown in FIGURE 1b. A light source is positioned so that a collimated beam of light is directed against the transparent plate 31 and the grid of transparent electrodes 35a, 35b, 35c, 35d. The incident light is arranged to make a small angle (less than 22°) to the plate 31. The observer is positioned in front of the transparent plate 31, and sees the entire plate as dark, since the incident light is reflected away from the observer by the opaque substrate 32 in a regular manner with the angle of reflection equal the angle of incidence, while the line of sight of the observer is normal to the transparent substrate. When a voltage is applied between one electrode strip of the group 35a, 35b, 35c, 35d, and another electrode of the group 36a, 36b, 36c, 36d, then provided the applied voltage is sufficient to attain the required threshold value of the order of 1,000 volts per centimeter, the observer will see a portion of the transparent plate 31 become brighter than the remaining area of the plate. The portion of plate 31 that becomes brighter is that portion corresponding to the intersection of the two electrode strips which have been energized.

While the optical display devices of Examples III and IV utilized $x$–$y$ grids which are particularly suitable for displaying information in rectilinear coordinates, optical display devices having other arrangements for the grids may also be fabricated. For example, optical display devices may be manufactured as described below with a $\rho$–$\theta$ type of grid which is particularly useful for presenting information in polar coordinates.

Example V

An optical device is prepared utilizing two transparent substrates as in the embodiment of Example III. In the device of this example, the substrates are plates 41 and 42, which are shown in plan view in FIGURE 4. Plates 41 and 42 are made of Pyrex glass in this example. A plurality of transparent conductive strips such as 45a, 45b, 45c, 45d, 45e are deposited on one face of plate 41 in the form of a series of concentric circular sections. A plurality of transparent conductive strips or electrodes 46a, 46b, 46C, 46d, 46e, are deposited on one face of plate 42 as straight lines diverging from a common central point. Electrical lead wires 47a, 47b, 47c, 47d, 47e are attached to transparent electrodes 45a, 45b, 45c, 45d, 45e respectively. Similarly, lead wires 48a, 48b, 48c, 48d, 48e are attached to transparent electrodes 46a, 46b, 46c, 46d, 46e respectively. The plates are positioned parallel to each other and about 80 microns apart. Plates 41 and 42 are aligned so that the two sets of transparent electrodes are opposite each other on the inner faces of the assemblage, and the central point of the concentric circular electrodes 45a, 45b, 45c, 45d, 45e, is opposite the central point of the diverging linear electrodes 46a, 46b, 46c, 46d, 46e. The space between the two sets of electrodes is filled with an organic nematic thermotropic compound, which in this example consists of 4,4' di-n-heptoxy-azoxybenzene.

The operation of the device of this example is similar to that of the device in Example III, since the effect obtained depends on the modulation of the transmission of light through the device in a manner similar to that illustrated in FIGURE 2.

An advantage of the optical display device of this example is that the $\rho$–$\theta$ grid is easily adapted to indicate range and angle information of a body. Energizing the correct circular electrode of the 45 set of electrodes will give the range or distance to the body, while energizing the correct diverging strip electrode of the 46 set will give the azimuth or direction to the body.

Example VI

An optical display device is prepared with a $\rho$–$\theta$ grid generally similar to that of Example V, but utilizing one transparent substrate and one opaque reflecting substrate. In this example, plate 41 consists of a transparent material, and the circular electrode strips 45a, 45b, 45c, 45d, 45e on one face of plate 41 are also transparent. Plate 42 may consist of a polished metal, as in Example IV, with the linear conductive strips 46a, 46b, 46c, 46d, 46e being deposited over strips of insulating lacquer (not shown). The plates are positioned opposite and parallel to each other at a distance of about 100 microns apart. The space between the two sets of electrodes is filled with an organic nematic thermotropic compound, which in this example, consists of 4'-di(p-n-alkoxybenzylideneamino)-3-methylbiphenyl. The optical display device of this example operates by modulation of deflected light, in a manner similar to that described in Example IV and illustrated in FIGURE 1b.

Various modifications may be made without departing from the spirit and scope of the invention. For example, translucent substrates may be utilized instead of transparent substrates.

There have thus been described improved methods of modulating light and improved optical display devices.

What is claimed is:

1. An electro-optical display device comprising two spaced plates, the first said plate being transparent, the second said plate being reflecting;
   at least one transparent electrically conductive film on one face of said first plate;
   at least one electrically conductive film on one face of said second plate;
   said two plates being spaced with said faces bearing said conductive films adjacent and parallel and less than 500 microns apart;
   electrically conductive leads attached to said conductive films on said first and second plates;
   an organic nematic mesomorphic compound filling the space between said two plates, said compound having a threshold electric field which when exceeded causes said compound to scatter light;
   means for applying a voltage gradient between said leads to establish between said conductive films on said first and second plates an electric field which exceeds said threshold field; and,
   a light source and means for directing unpolarized collimated light rays from said source through said first plate and said compound toward said second plate, said rays making an incident angle of less than 45° to said first plate.

2. An electro-optical display device as in claim 1, wherein said organic nematic compound is selected from the group consisting of:

Compound—
   (1) Deca-2,4-dienoic acid
   (2) 4,4' di-n-heptoxyazoxybenzene
   (3) 4,4' di-n-hexoxyazoxybenzene
   (4) 4,4' di-n-pentoxyazoxybenzene
   (5) 4,4' di-n-butoxyazoxybenzene
   (6) 4,4'-diethoxyazoxybenzene
   (7) Undeca-2,4-dienoic acid
   (8) Nona-2,4-dienoic acid
   (9) 4,4'-dimethoxystilbene
   (10) 2,5-di(p-ethoxybenzylidene)cyclopentanone
   (11) 2,7-di-(benzylideneamino)fluorene
   (12) 2,p-methoxybenzylideneamino phenanthrene
   (13) 4-methoxy-4''-nitro-p-terphenyl
   (14) p-Azoxyanisole
   (15) 4-p-methoxybenzylideneaminobiphenyl
   (16) 4,4'-di-(benzylideneamino)biphenyl

(17) p-n-Hexylbenzoic acid
(18) p-n-Propoxybenzoic acid
(19) Trans-p-methoxycinnamic acid
(20) 6-methoxy-2-naphthoic acid 3. An electro-optical display device comprising two spaced transparent plates;
   at least one transparent electrically conductive film on one face of each of said plates;
   said two plates being spaced with said faces bearing said conductive films adjacent and parallel and less than 500 microns apart;
   electrically conductive leads attached to said conductive films on said two plates;
   an organic nematic mesomorphic compound filling the space between said two plates, said compound having a threshold electric field which when exceeded causes said compound to scatter light;
   means for applying a voltage gradient between said leads to establish between said conductive films on said two plates an electric field which exceeds said threshold field; and,
   a light source and means for directing unpolarized collimated light rays from said source through said two plates and said compound, said rays being normal to said plates.

4. An electro-optical display device as in claim 3, wherein said organic nematic compound is selected from the group consisting of:

Compound—
   (1) Deca-2,4-dienoic acid
   (2) 4,4′ di-n-heptoxyazoxybenzene
   (3) 4,4′ di-n-hexoxyazoxybenzene
   (4) 4,4′ di-n-pentoxyazoxybenzene
   (5) 4,4′ di-n-butoxyazoxybenzene
   (6) 4,4′-diethoxyazoxybenzene
   (7) Undeca-2,4-dienoic acid
   (8) Nona-2,4-dienoic acid
   (9) 4,4′-dimethoxystilbene
   (10) 2,5-di(p-ethoxybenzylidene)cyclopentanone
   (11) 2,7-di-(benzylideneamino)fluorene
   (12) 2,p-methoxybenzylideneamino phenanthrene
   (13) 4-methoxy-4″-nitro-p-terphenyl
   (14) p-Azoxyanisole
   (15) 4-p-methoxybenzylideneaminobiphenyl
   (16) 4,4′-di-(benzylideneamino)biphenyl
   (17) p-n-Hexylbenzoic acid
   (18) p-n-Propoxybenzoic acid
   (19) Trans-p-methoxycinnamic acid
   (20) 6-methoxy-2-naphthoic acid 5. An electro-optical display device comprising two spaced plates, the first said plate being transparent, the second said plate being reflecting;
   an array of transparent electrically conductive films on one face of said first plate, said films forming parallel strips;
   an array of electrically conductive films on one face of said second plate, said films forming parallel strips;
   said two plates being spaced with said faces bearing said arrays of conductive strips adjacent and parallel and less than 500 microns apart, the direction of said strips in one said array being perpendicular to the direction of said strips in the other said array;
   electrically conductive leads attached to each of said conductive strips on said first and second plates;
   an organic nematic thermotropic compound filling the space between said two plates, said compound having a threshold electric field which when exceeded causes said compound to scatter light;
   means for applying a voltage gradient between said leads to establish between any said conductive strip on said first plate and any said conductive strip on said second plate an electric field which exceeds said threshold field; and,
   a light source and means for directing unpolarized collimated light rays from said source through said first plate and said compound toward said second plate, said beam making an incident angle of less than 45° to said first plate.

6. An electro-optical display device as in claim 5, wherein said organic nematic compound is selected from the group consisting of:

Compound:
   (1) deca-2,4,dienoic acid
   (2) 4,4′ di-n-heptoxyazoxybenzene
   (3) 4,4′ di-n-hexoxyazoxybenzene
   (4) 4,4′ di-n-pentoxyazoxybenzene
   (5) 4,4′ di-n-butoxyazoxybenzene
   (6) 4,4′-diethoxyazoxybenzene
   (7) Undeca-2,4-dienoic acid
   (8) Nona-2,4-dienoic acid
   (9) 4,4′-dimethoxystilbene
   (10) 2,5-di(p-ethoxybenzylidene)cyclopentanone
   (11) 2,7-di-(benzylideneamino)fluorene
   (12) 2,p-methoxybenzylideaneamino phenanthrene
   (13) 4-methoxy-4″-nitro-p-terphenyl
   (14) p-Azoxyanisole
   (15) 4-p-methoxybenzyl ideneaminobiphenyl
   (16) 4,4′-di-(benzylideneamino)biphenyl
   (17) p-n-Hexylbenzoic acid
   (18) p-n-Propoxybenzoic acid
   (19) Trans-p-methoxycinnamic acid
   (20) 6-methoxy-2-naphthoic acid 7. An electro-optical display device comprising first and second spaced transparent plates;
   an array of transparent electrically conductive films on one face of each of said plates, said films forming parallel strips;
   said plates being spaced with said faces bearing said arrays of conductive films adjacent and parallel and less than 500 microns apart, the direction of said strips in one said array being perpendicular to the direction of said strips in the other said array;
   electrically conductive leads attached to each of said conductive strips on said first and second plates;
   an organic nematic thermotropic compound filling the space between said plates, said compound having a threshold electric field which when exceeded causes said compound to scatter light;
   means for applying a voltage gradient between said leads to establish between any said conductive strip on said first plate and any said conductive strip on said second plate an electric field which exceeds said threshold field; and,
   a light source and means for directing unpolarized collimated light rays from said source through said transparent plates and said compound, said rays being normal to said first plate.

8. An electro-optical display device comprising two spaced plates, the first said plate being transparent, the second said plate being reflecting;
   an array of transparent electrically conductive films on one face of said first plate;
   an array of electrically conductive films on one face of said second plate;
   the films of one said array being linear segments and diverging from a point, the films of the other said array being circular segments concentric about a point;
   said two plates being spaced with said faces bearing said conductive films adjacent and parallel and less than 500 microns apart, said two points being opposite each other;
   electrically conductive leads attached to each of said conductive films on said first and second plates;
   an organic nematic thermotropic compound filling the space between said two plates, said compound having a threshold electric field which when exceeded causes said compound to scatter light;

means for applying a voltage gradient between said leads to establish between any selected said film on said first plate and any selected said film on said second plate an electric field which exceeds said threshold field; and, a light source and means for directing unpolarized collimated light rays from said source through said first plate and said compound toward said second plate, said beam making an incident angle of less than 45° to said first plate.

9. An electro-optical display device comprising first and second spaced transparent plates;

an array of transparent electrically conductive films on one face of each of said plates;

the films of one said array being linear segments and diverging from a point, the films of the other said array being circular segments concentric about a point;

said two plates being spaced with said faces bearing said conductive films adjacent and parallel and less than 500 microns apart, said two points being opposite to each other;

electrically conductive leads attached to each of said conductive films on said first and second plates;

an organic nematic thermotropic compound filling the space between said two plates, said compound having a threshold electric field above which said compound scatters light;

means for applying a voltage gradient between said leads to establish between any said film on said first plate and any said film on said second plate an electric field which exceeds said threshold field; and, a light source and means for directing unpolarized collimated light rays from said source through said two transparent plates and said compound, said rays being normal to said first plate.

References Cited

UNITED STATES PATENTS

| | | | |
|---|---|---|---|
| 1,963,496 | 6/1934 | Land | 88—61 |
| 2,543,793 | 3/1951 | Marks | 88—61 X |
| 3,202,810 | 8/1965 | Steiner | 235—197 |
| 3,215,038 | 11/1965 | Heller et al. | 88—61 |

FOREIGN PATENTS 441,274   1/1936   Great Britain.

OTHER REFERENCES

Brown et al.: "The Mesomorphic State," Chemical Reviews, vol. 57, No. 6, December 1957, pp. 1067–1071 and 1115–1116.

Chatelain: "Sur la Diffusion, par les Cristaux Liquides du Type Nematique de la Lumiere Polarisee," Acta Cryst., vol. 1, pp. 315–323, 1948.

Grey: Molecular Structure and the Properties of Liquid Crystals, pp. 66–78; 119–121; 305–314.

Naggair: "Phenomenes d'Orientation dans les Liquides Nematiques," Annales de Physique, vol. 18, pp. 34–41, 1943.

Ornstein et al.: "New Arguments for the Swarm Theory of Liquid Crystals," Transactions of the Faraday Society, vol. 29, part 9, September 1933, pp. 933–936.

Zocher: "The Effect of a Magnetic Field on the Nematic State," Transactions of the Faraday Society, vol. 29, part 9, September 1933, pp. 945–957.

JEWELL H. PEDERSEN, *Primary Examiner.*

RONALD L. WIBERT, *Examiner.*

L. ORLOFF, E. S. BAUER, *Assistant Examiners.*